United States Patent [19]

Stoegmueller

[11] Patent Number: 4,772,214

[45] Date of Patent: Sep. 20, 1988

[54] PROTECTED-TYPE ELECTRICAL CONTACTING MEANS

[75] Inventor: Rupert Stoegmueller, Poing, Fed. Rep. of Germany

[73] Assignee: Siemens Aktiengesellschaft, Berlin and Munich, Fed. Rep. of Germany

[21] Appl. No.: 89,565

[22] Filed: Aug. 26, 1987

[30] Foreign Application Priority Data

Sep. 19, 1986 [DE] Fed. Rep. of Germany ....... 8625125

[51] Int. Cl.⁴ ............................................ H01R 13/44
[52] U.S. Cl. .................................... 439/140; 439/138; 439/142
[58] Field of Search ................................. 439/136–145

[56] References Cited

U.S. PATENT DOCUMENTS 3,491,326  1/1970  Pfister et al. .......................... 439/141
4,592,609  6/1986  Kasai et al. ........................... 439/140

*Primary Examiner*—Gil Weidenfeld
*Assistant Examiner*—Paula A. Austin
*Attorney, Agent, or Firm*—Hill, Van Santen, Steadman & Simpson

[57] ABSTRACT

In a hand-held broadcast means of communications technology, the charging device for the integrated battery is connected via a covered plug. The cover of the plug is automatically opened when the hand-held broadcast device is placed onto the charging device and the path for the cooperating plug of the charging device is thus exposed.

2 Claims, 2 Drawing Sheets

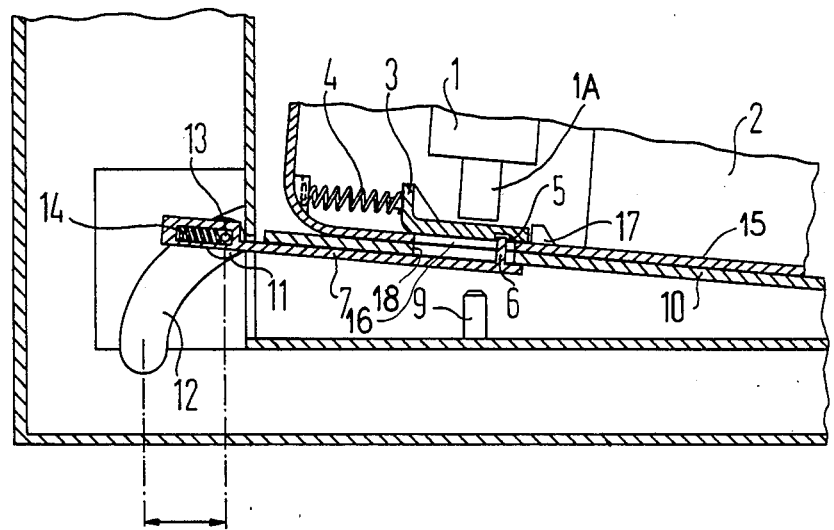
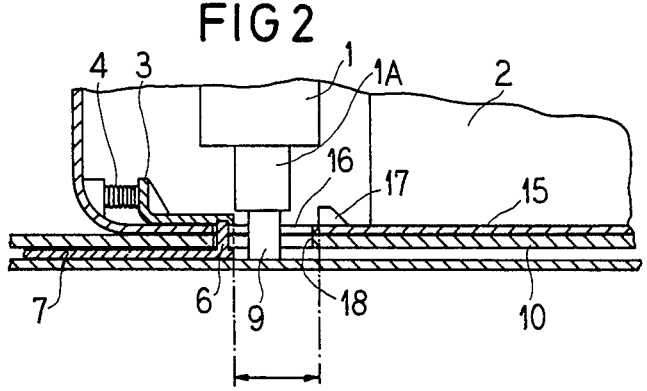

PROTECTED-TYPE ELECTRICAL CONTACTING MEANS

BACKGROUND OF THE INVENTION

1. Field of the Invention

The invention is directed to a protected-type electrical contacting means, particularly for the power supply of portable communications-technology apparatus.

2. Summary of the Invention

Given re-chargable power supplies of electrical apparatus, particularly of hand-held broadcast apparatus for radio telephones in this example, the connection to the charging device should be arranged in covered and protected fashion.

An object of the invention is to provide an interlock which automatically unlocks when the hand set is placed on the charging device.

This object is inventively achieved in that the single contact pin of the device is arranged in the inside of its housing behind a disk that can be displaced in the housing of the apparatus perpendicular to the plug-in direction, this disk being closed by a spring in the quiescent condition and outwardly having a channel into which a pimple of an actuating rod in the housing of the power supply device engages and pushes the closing disk toward the side against the pressure of the spring before the contact and exposes the path for the contacting pin.

BRIEF DESCRIPTION OF THE DRAWINGS

The invention shall be set forth in greater detail below with reference to an exemplary embodiment shown in the FIGS.

FIG. 1 is a partial side sectional view showing the portion of the hand-held broadcast device important for the contacting together with the charging apparatus in its non-contacted condition.

FIG. 2 shows the apparatus of FIG. 1 in its contacted condition.

DESCRIPTION OF THE PREFERRED EMBODIMENTS

Figure 3:
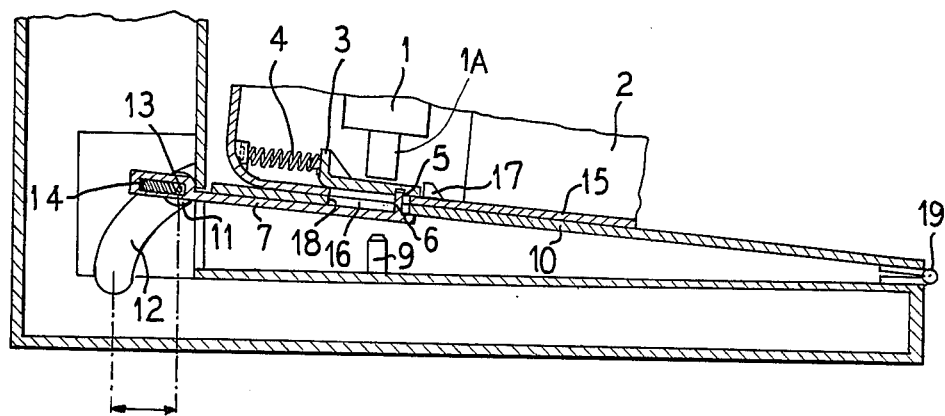
FIG. 3 is a partial side sectional view showing the hinge apparatus of the cover.

A hand-held broadcast device whose portion important for this purpose is referenced 2 has a power supply plug 1 which is arranged covered in the interior. A disk 3 displaceable parallel to a housing wall 15 is provided for covering an opening 16 provided in the underside of the housing wall 15. The disk 3 is prestressed against a block 17 with a shoulder by means of a spring 4, so that the plug is covered by it. The disk 3 has an outwardly directed channel 5 into which a pimple 6 of an actuating rod or slide 7 engages. The actuating rod is displaceably seated at a cover 10 of the charging device. The pimple 6 thereby extends through an opening 18 in the cover 10 down to the channel 5 of the disk.

When the slide 7 is actuated against the spring power of the spring 4, then the opening for the contacting of a contact 1A of the power supply plug 1 and a contact plug 9 projecting out of the charging device is exposed.

The following mechanism is provided in order to automate the operation. First, the cover 10 of the charging device is held in movable fashion by a hinge 19 situated at the outside right in the FIG. A continuation of the actuating rod 7 extends through a housing opening at the other side and has a roller 11 at this end which engages into a curve or cam channel 12. When, after the seat of the hand-held broadcast device has been placed on the cover 10, the latter is pressed down, then the roller 11 rolls off in the curved or cam channel 12 and pulls the slide completely up into the final position, whereby the pin 9 of the charging device simultaneously engages through the arising opening into the cooperating contact 1A of the hand-held broadcast device.

In order to compensate tolerances, the roller 11 is guided movably perpendicular to its axis 13 and is pre-stressed by a spring 14.

Thereby arising in an arrangement which, on the basis of mutual interaction between the handset and the charging device, produces an automatic contacting, whereby the handset can be tightly closed in its lifted-off condition.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. A protected-type electrical contacting means for a communications device and a power supply device comprising the improvement wherein a contact pin of the communications device is arranged in the inside of its housing behind a closing disk displaceable in the housing of the communications device perpendicular to the plug-in direction, this disk being closed by a spring in the quiescent condition and having an outwardly directed channel into which a pimple of an actuating rod in a housing of the power supply device engages and pushes the closing disk to the side against the pressure of the spring before a contacting of the communications device contact pin and a contact pin of the power supply device and exposes a path for the contact pins, wherein the actuating rod is arranged as a sliding member in the inside of a cover of the power supply device, said cover being hingeable in hinge-like fashion, and said actuating rod having a roller at one end which engages into a cam channel in the housing of the power supply device and, given pressure against the cover, opens the disk by rolling off in the cam channel providing simultaneous engagement of said contact pins.

2. An electrical contacting means according to claim 1, wherein an axis of the roller is pre-stressed transversely relative to its direction for tolerance compensation, being pre-stressed by a spring.

* * * * *